(12) United States Patent
Krohn et al.

(10) Patent No.: US 7,515,505 B2
(45) Date of Patent: Apr. 7, 2009

(54) METHOD FOR CONTINUOUS SWEEPING AND SEPARATION OF MULTIPLE SEISMIC VIBRATORS

(75) Inventors: Christine E. Krohn, Houston, TX (US); Marvin L. Johnson, The Woodlands, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 0 days.

(21) Appl. No.: 12/150,291

(22) Filed: Apr. 25, 2008

(65) Prior Publication Data

US 2008/0205193 A1 Aug. 28, 2008

Related U.S. Application Data

(63) Continuation of application No. 10/564,708, filed as application No. PCT/US2004/017335 on Jun. 3, 2004, now abandoned.

(60) Provisional application No. 60/494,194, filed on Aug. 11, 2003.

(51) Int. Cl.
*G01V 1/37* (2006.01)

(52) U.S. Cl. .............. 367/49; 367/41; 367/48; 367/189; 702/14; 702/17

(58) Field of Classification Search ............ 367/41–42, 367/49–51, 189–190, 48; 181/111–114
See application file for complete search history.

(56) References Cited

U.S. PATENT DOCUMENTS

| | | | | |
|---|---|---|---|---|
| 5,347,494 A | * | 9/1994 | Andersen | 367/42 |
| 5,410,517 A | * | 4/1995 | Andersen | 367/75 |
| 5,550,786 A | * | 8/1996 | Allen | 367/48 |
| 5,703,833 A | * | 12/1997 | Allen | 367/46 |
| 5,715,213 A | * | 2/1998 | Allen | 367/48 |
| 5,719,821 A | * | 2/1998 | Sallas et al. | 367/41 |
| 5,721,710 A | * | 2/1998 | Sallas et al. | 367/41 |
| 5,822,269 A | * | 10/1998 | Allen | 367/41 |
| 6,754,590 B1 | * | 6/2004 | Moldoveanu | 702/14 |
| 6,766,256 B2 | * | 7/2004 | Jeffryes | 702/17 |
| 6,807,508 B2 | * | 10/2004 | Becquey | 702/124 |
| 6,842,701 B2 | * | 1/2005 | Moerig et al. | 702/14 |
| 7,050,356 B2 | * | 5/2006 | Jeffryes | 367/41 |
| 2002/0091487 A1 | * | 7/2002 | Moerig et al. | 702/2 |
| 2003/0093224 A1 | * | 5/2003 | Jeffryes | 702/14 |
| 2004/0148104 A1 | * | 7/2004 | Moerig et al. | 702/14 |

* cited by examiner

*Primary Examiner*—Jack W. Keith
*Assistant Examiner*—Scott A Hughes

(57) ABSTRACT

A method for simultaneously operating multiple seismic vibrators using continuous sweeps (little or no "listening" time between sweeps) for each vibrator, and recovering the separated seismic responses for each vibrator with the earth signature removed. Each vibrator is given a unique, continuous pilot signal. The earth response to the motion of each vibrator is measured or estimated. The vibrator motion records for each vibrator and the combined seismic data record for all the vibrators are parsed into separate shorter records. The shorter records are then used to form a system of simultaneous linear equations in the Fourier transform domain, following the HFVS method of Sallas and Allen. The equations are then solved for the separated earth responses.

18 Claims, 7 Drawing Sheets

METHOD FOR CONTINUOUS SWEEPING AND SEPARATION OF MULTIPLE SEISMIC VIBRATORS

CROSS-REFERENCE TO RELATED APPLICATIONS

This application is a continuation of U.S. application Ser. No. 10/564,708, filed Jan. 13, 2006, now abandoned which is the National Stage of International Application No. PCT/US04/17335, filed Jun. 3, 2004, which claims the benefit of U.S. Provisional Application No. 60/494,194 filed on Aug. 11, 2003.

FIELD OF THE INVENTION

This invention relates to the field of seismic data acquisition. Specifically, this invention is a method of acquiring seismic data using multiple vibrators without a multiple sweep listening time requirement.

BACKGROUND OF THE INVENTION

Seismic vibrators have long been used in the seismic data acquisition industry to generate the acoustic signals needed in geophysical exploration. The conventional use of vibrators involves several well-understood steps. First, one or more vibrators are located at a source point on the surface of the earth. Second, the vibrators are activated for several seconds, typically ranging from four to sixteen, with a pilot signal. The pilot signal is typically a sweep signal that varies in frequency during the period of time in which the vibrators are activated. Third, seismic receivers are used to receive and record response data for a period of time equal to the sweep time plus a listen time. The period of time over which data is recorded includes at a minimum the time necessary for the seismic signals to travel to and reflect off of the target reflectors of interest, and for the reflected signals to return to the receivers. Fourth, seismograms are generated by cross correlating the recorded data with either the pilot signal or a reference sweep. Fifth, the sweep and correlation steps are repeated several times, typically four to eight, and the correlations are added together in a process referred to as stacking. Finally, the vibrators are moved to a new source point and the entire process is repeated.

Several problems are known to exist with conventional vibrator technology. First, the correlation process is known to result in correlation side lobes, which can influence the accuracy of the final processed data. Second, vibrator harmonic distortion results in noise, known as harmonic ghosts, after correlation with the pilot. A partial solution to this problem is the use of upsweeping pilot signals, in which the sweep starts at low frequencies and increases to high frequencies. This approach places the correlation ghosts before the main correlation peak where they will not interfere with later, and hence weaker, reflections. In addition, to minimize noise from harmonics, multiple sweeps are performed with incremental phase rotation of the sweeps so that after correlation and stack, the harmonics are reduced. For example, to suppress harmonics through fourth order, four sweeps might be performed with a phase rotation of 360 degrees divided by four, i.e., 0, 90, 180, and 270 degrees. The data are stacked after correlation with harmonics accordingly reduced, although not eliminated. Third, in order to accurately process the recorded data, both the sweep time and a listen time must be included in the recording time of the seismic receivers for each sweep. The listen time is important to ensure that the resulting data from each sweep can be accurately processed. In addition, multiple sweeps are often required to inject sufficient energy into the ground. Multiple short sweeps can result in better data quality than long sweeps through the use of phase rotations to reduce harmonic noise and by reducing ground roll reverberations. However, the use of multiple sweeps with each sweep followed by a listening time limits the rate at which energy can be put into the ground and the survey acquired. Fourth, the recording of high frequencies can be limited by the simultaneous recording of the signals from an array of vibrators, each vibrator at a different position and elevation and having a different coupling with the ground.

The cost of land surveys largely depends on the time it takes to record the survey, and cost is affected by the length of time required to record data at each source station as well as the time it takes to move the vibrators to the next station. The time taken to record data at each source station depends on the number of sweeps, the sweep length, and the listen time. For example, if four 8-second sweeps are performed, each having a 7-second listening time, at least 60 seconds is required at each station. Typical data acquisition systems also require 3-5 seconds before they are ready to start a new record, which can add another 12-20 seconds to the time at the source station. If multiple stations could be recorded simultaneously, or the need for a listening time reduced or eliminated, then less time would be needed for recording the survey, therefore reducing the overall cost of the survey. Similarly, improved methods of reducing side lobe correlations and harmonic ghosts would improve the quality of land surveys.

In 1995, Andersen in U.S. Pat. No. 5,410,517 disclosed a method to cascade vibrator sweeps to eliminate unproductive listening times, while still maintaining the advantages of using multiple short sweeps. The method includes an incremental phase rotation of the sweep segments and the use of a second cascaded sweep with an extra sweep segment to suppress harmonic ghosts after correlation with the reference. For example, but without limitation, in a seismic acquisition program in which it was desired to reduce up to the fourth order harmonic, four sweep segments with an appropriate phase rotation are required. The phase rotation angles could be 0, 90, 180, and 270 degrees, respectively, although other choices could also be made. If eight-second sweep segments were used and 7 seconds listening time is required, then the total record time is 39 seconds. This compares to a standard sweep and listen time for 4 sweeps, which is 60 seconds. Combined with Andersen's prior U.S. Pat. No. 5,347,494, which disclosed a method of producing simple seismic wavelet shapes with minimal side lobe energy, improved quality vibrator data can be obtained. Nevertheless, even with this improved quality data the limitations of the correlation process, problems with harmonics ghosting, and array limitations are present.

Another method used by industry to increase the rate of seismic acquisition is to use more than one vibrator and record multiple source locations simultaneously. Typically, pilot sweeps with different phases or different frequency ranges are used to drive the different vibrators. The data are then correlated with each of the individual pilot sweeps to separate the data. Multiple sweeps are used to increase energy, and the cross correlations are added (stacked). Phase rotation of the sweeps also may be used to reduce harmonics. Separation of the data is imperfect. Instead of clean vibrator records, the separated records may contain residual energy from other vibrators operating simultaneously.

An alternative approach for separating vibrator signals and eliminating harmonics is taken by the High Fidelity Vibratory Seismic Method (HFVS) disclosed in U.S. Pat. Nos. 5,719,821 and 5,721,710 to Sallas, et al. In the HFVS method the recorded seismic data are not correlated with a pilot signal, but instead are inverted using measured vibrator signatures from each sweep and each vibrator. Because the measured signatures include harmonics, the inversion of the corresponding records recovers those harmonics in the processed data, and thereby does not result in additional noise in the data. Because correlation is not used, correlation side lobes do not exist as a potential problem. Furthermore, inversion with a measured vibrator signature can reduce effects from variable vibrator coupling with the earth. However, in this method the vibrator motion for each data record is measured and used in the processing steps. The method includes use of a matrix inversion method to separate the signals from individual vibrators recording simultaneously. The matrix inversion requires that the number of sweeps M be greater than or equal to the number of vibrators N in order to solve a set of linear equations for the N vibrator signals. The ability to separate vibrator responses requires that any two vibrators must differ in at least one of their M sweeps. An advantageous way to accomplish this is to phase-encode the M sweeps, typically with one vibrator at a time sweeping with a phase shift relative to the other vibrators. The M×N vibrator signatures are used to design a filter matrix that converts the M data records into N output records, one per each vibrator. Separation of vibrator records up to 60 dB has been achieved with no visible degradation of the records from simultaneous recordings.

The HFVS method is more fully described in association with FIG. 1, which depicts a typical land-based data acquisition system geometry, and FIG. 2, which depicts typical sweeps for four vibrators which may be used in that data acquisition system. FIG. 1 shows four vibrators 18, 20, 22, and 24, mounted on vehicles 34, 36, 38, and 40. The four different signatures transmitted into the ground during sweep i may be called $s_{i1}, s_{i2}, s_{i3}, s_{i4}$. Each signature is convolved with a different earth reflectivity sequence $e_1, e_2, e_3, e_4$ which includes reflections 26 from the interface 28 between earth layers having different impedances (the product of the density of the medium and the velocity of propagation of acoustic waves in the medium). A trace $d_i$ recorded at a geophone 30 is a sum of the signature-filtered earth reflectivities for each vibrator. Formulating this mathematically, data trace $d_i(t)$ recorded for sweep i is:

$$d_i(t) = \sum_{j=1}^{N} s_{ij}(t) \otimes e_j(t) \tag{1}$$

where $s_{ij}(t)$=sweep i from vibrator j, $e_j(t)$=earth reflectivity seen by vibrator j and $\otimes$ denotes the convolution operator.

Persons skilled in the art will understand the convolution operation and the convolution model upon which Equation (1) is based. Other readers may refer to standard treatises such as the *Encyclopedic Dictionary of Exploration Geophysics*, by R. E. Sheriff, 4th Ed. (2002), published by the Society of Exploration Geophysicists. (See the definitions of "convolution" and "convolutional model.") The noise term in Sheriff's definition of "convolutional model" has been neglected in Equation (1). This model is a consequence of the concept that each reflected seismic wave causes its own effect at each geophone, independent of what other waves are affecting the geophone, and that the geophone response is simply the sum (linear superposition) of the effects of all the waves.

Thus, in this method N vibrators radiate M≧N sweeps into the earth, resulting in M recorded data traces. The HFVS method involves finding an operator, by solving a set of linear equations based on the known M×N vibrator signatures, that finds the set of N earth reflectivities that best predicts the recorded data. In the frequency domain, i.e., after Fourier transformation, the set of equations represented by Equation (1) are linear and can be written:

$$D_i(f) = \sum_{j=1}^{N} s_{ij}(f) E_j(f) \tag{2}$$

or, in matrix form for M sweeps and N vibrators, $$\begin{bmatrix} S_{11} & S_{12} & \cdot & S_{1N} \\ S_{21} & S_{22} & \cdot & S_{2N} \\ S_{31} & S_{32} & \cdot & S_{3N} \\ S_{41} & S_{42} & \cdot & S_{4N} \\ \cdot & \cdot & \cdot & \cdot \\ S_{M1} & S_{M2} & \cdot & S_{MN} \end{bmatrix} \begin{bmatrix} E_1 \\ E_2 \\ E_3 \\ \cdot \\ E_N \end{bmatrix} = \begin{bmatrix} D_1 \\ D_2 \\ D_3 \\ D_4 \\ \cdot \\ D_M \end{bmatrix} \tag{3}$$

or $$S\vec{E} = \vec{D} \tag{4}$$

If the number of sweeps is equal to the number of vibrators, this system of simultaneous equations can be solved for $\vec{E}$:

$$\vec{E} = F\vec{D} \tag{5}$$

where $$F = (S)^{-1}. \tag{6}$$

F is the filter or operator which when applied to the data separates it into individual vibrator records.

For M≧N, Equation (4) may be solved by the method of least squares. For this more general situation, Equation (4) can be written $$S^* S \vec{E} = S^* \vec{D} \tag{7}$$

where S* is the conjugate transpose of matrix S. Then, $$\vec{E} = (S^*S)^{-1} S^* \vec{D}, \tag{8}$$

and the filter F becomes $$F = (S^*S)^{-1} S^*. \tag{9}$$

The HFVS method can be used to record multiple source points simultaneously using a number of vibrators, but the use of more vibrators requires more individual sweeps each with its own listening time. It was previously not thought possible to eliminate the listening time, because the M sweep records must be separate unrelated measurements in order to solve the set of linear equations, i.e., otherwise the M equations (involving N unknowns) would not be independent. If the sweeps are cascaded without a listening time, then the reflection data from one segment would interfere with data from the subsequent sweep segment. In addition, there would not be a one-to-one correspondence between the data and the measured vibrator motions which represent the signatures put into the ground, so that harmonics would not be handled properly. The present invention solves these problems.

SUMMARY OF THE INVENTION

In one embodiment, the present invention is a method of operating N multiple seismic vibrators simultaneously at the same or different source points using continuous sweeps (i.e., realizing the benefits of multiple sweeps without the disadvantage of a listen time at the end of every sweep), and separating the seismic response for each vibrator, which comprises the steps of (a) loading each vibrator with a unique continuous pilot sweep consisting of N segments; (b) activating the vibrators and using an array of detectors to detect and record the combined seismic response signals from all vibrators; (c) recording the measured motion for each vibrator during the sweep; (d) parsing each motion record into N shorter records coinciding with the sweep segments, and then padding the end of each shorter record sufficiently to provide, in effect, a listening time for the shorter motion record; (e) forming an N×N matrix s whose element $s_{ij}(t)$ is the padded shorter vibrator motion record for the $i^{th}$ vibrator and $j^{th}$ sweep segment; (f) parsing the seismic data record from step (b) into N shorter records, each shorter record coinciding in time with a padded shorter vibrator motion record; (g) forming a vector $\vec{d}$ of length N whose element $d_i$ is the $i^{th}$ shorter data record from the preceding step; (h) solving for earth response $E_j(f)$ using the system of N linear equations and N unknowns, $S\vec{E} = \vec{D}$, where $s_{ij}(f)$ is the Fourier transform of $s_{ij}(t)$ and $D_i(f)$ is the Fourier transform of $d_i(t)$, where i=1, 2, ... N and j=1, 2, ... N; and (h) inverse Fourier transforming the earth response $E_j(f)$ back from the frequency (f) domain to the time (t) domain to yield $e_j(t)$.

In other embodiments, the vibrator motion records and the seismic data records may be parsed into M shorter records where M>N. In addition, the motions of the vibrators may be approximated by using theoretical waveforms for the source signatures instead of measured motion records. Harmonic noise is further reduced in preferred embodiments by using sweep signals for the multiple vibrators that differ from each other only in the phase rotation of one or more sweep segments.

BRIEF DESCRIPTION OF THE DRAWINGS

The present invention and its advantages will be better understood by referring to the following detailed description and the attached drawings in which.

Changes and modifications in the specifically described embodiments can be carried out without departing from the scope of the invention, which is intended to be limited only by the scope of the appended claims.

DESCRIPTION OF THE INVENTION

The present invention is a method for improving the efficiency of acquiring vibratory data with HFVS techniques. With the HFVS method, data from a number of vibrators shaking simultaneously in seismic proximity to one another are separated by using (in one embodiment) a number of phase-encoded sweeps, where the number of sweeps is greater than or equal to the number of vibrators, resulting in a set of linear equations that can be solved simultaneously. The record length for each sweep includes an associated listen time containing reflections. The present invention eliminates the unproductive listening time for multiple sweeps but still provides the ability to separate the vibrator records and reduce contamination from harmonics. Production rates can be increased by as much as 30-80%.

Figure 1:
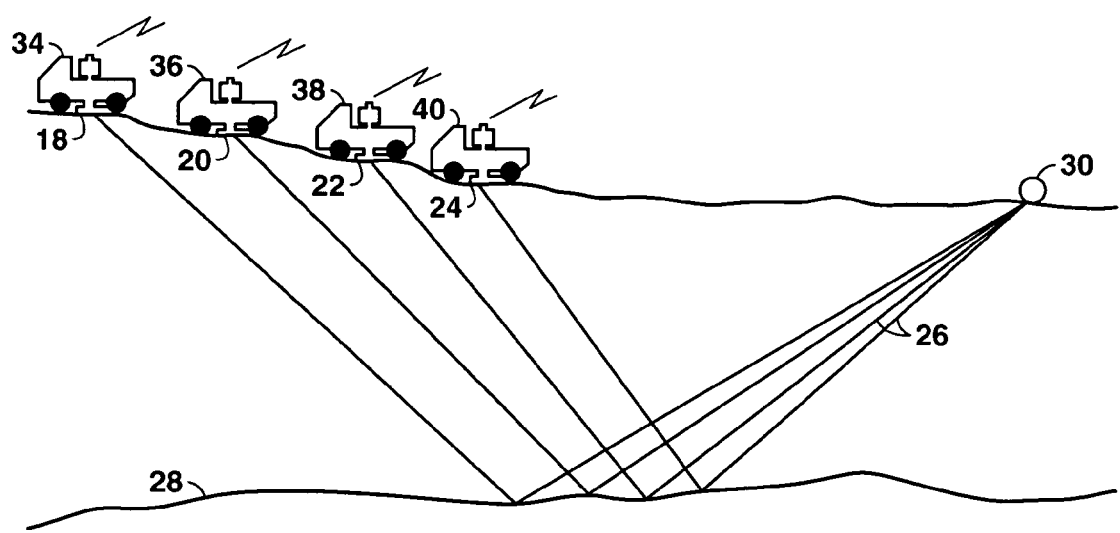
FIG. 1 is a schematic diagram of a typical land-based acquisition geometry for four vibrators.
Figure 3:
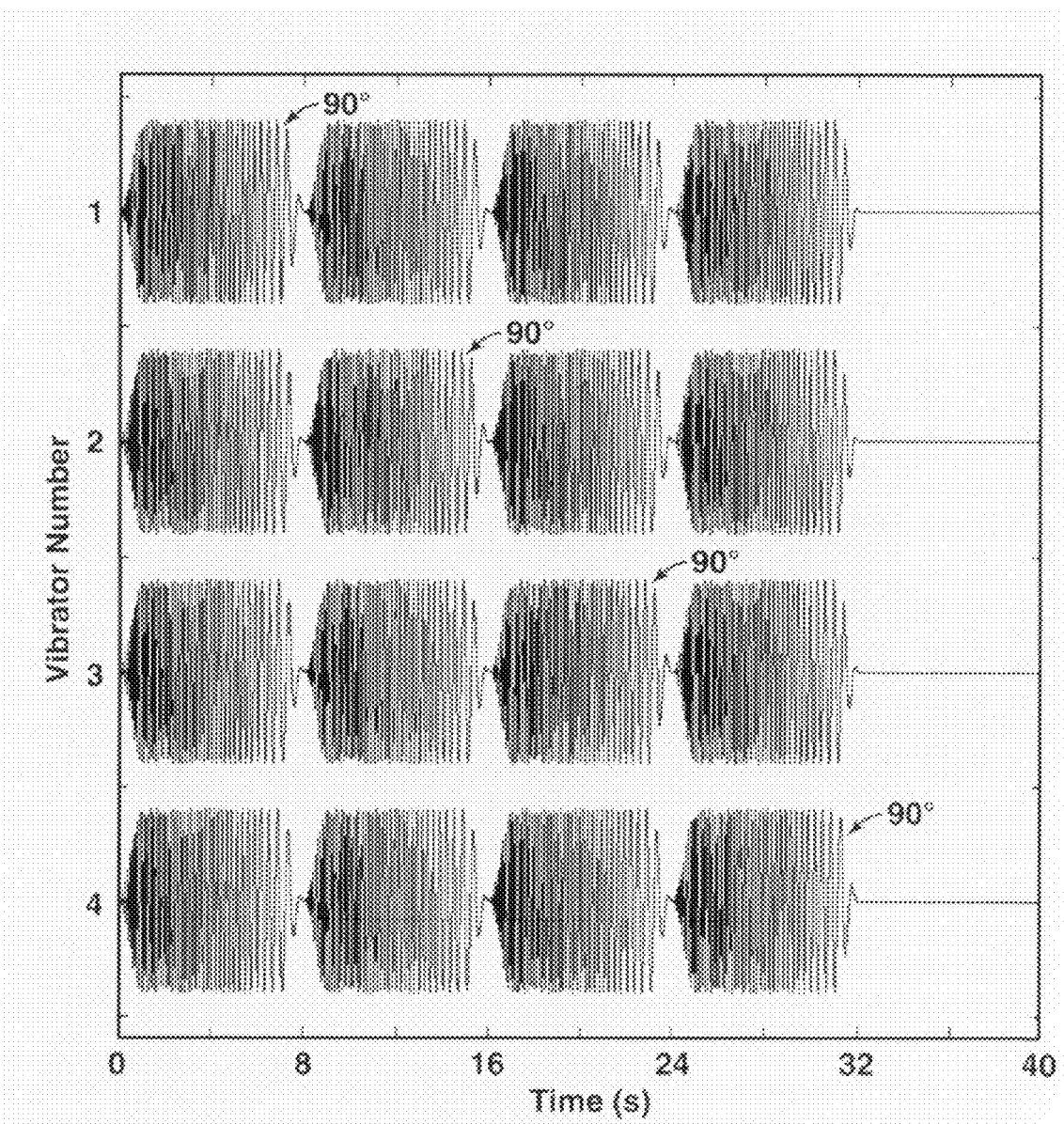
FIG. 3 shows sweeps for four vibrators in one embodiment of the present invention.

In the present invention, multiple vibratory sources are used to record a land or marine seismic survey, and the signals are recorded by one or more detectors as shown in FIG. 1 for a land survey. Each vibrator is excited by a different continuous sweep consisting of M segments, where M must be greater than or equal to the number of vibrators N, as illustrated in FIG. 3 for four vibrators and four segments. In the embodiment depicted in FIG. 3, each sweep segment is composed of a full sweep from conventional HFVS, eliminating the listening time between sweeps. Using such a sweep design, the vibrator begins and ends each sweep segment at rest. However, such a constraint is not necessary for the present inventive method. Segmenting the sweep for each vibrator is a fundamental requirement of the present invention, but the sweep need not be designed around a pre-selected segment. Instead, segmenting may be an arbitrary, after-the-fact step of parsing a longer sweep into shorter parts, with the only requirements on the longer sweep being the same as for any vibrator sweep in conventional vibroseis: the sweep should not exceed the inertial limitations of the vibrator, and the sweep should contain the full range of frequencies needed for target penetration and resolution. Two particular types of sweeps that may be familiar to vibrator users are upsweeps (steadily increasing frequency) and down-sweeps (steadily decreasing frequency). Both work well in the present invention; e.g., the segments may be upsweeps or down-sweeps. However, the present invention will work with segments that employ any physically realizable sweep type including linear, nonlinear and pseudo-random. In some preferred embodiments, each sweep segment is a linear up or down sweep that encompasses the full range of frequencies required for imaging the reflectors with the desired resolution as would be familiar to those who design seismic acquisition surveys. In other embodiments, the sweep segments could be composed of a combination of upward and downward progressions in frequency, nonlinear sweeps, or pseudo-random sequences.

In preferred embodiments of the present invention, the duration of each segment is greater than the travel time for the target reflectors or greater than the listening time for conventional recording. Just as with the correlation process, inversion of vibrator data compresses the energy from a sweep or sweep segment into a pulse. If a second sweep segment begins sooner than the travel time to and back from the deepest reflector of interest (the "listening time"), then shallow reflections from the second segment can interfere with the deep reflections from the first segment. A dead time of any length can be inserted between segments, but preferably the dead time is zero because this is the value of the invention. As used herein in connection with the present invention, a "continuous sweep" means a sweep in which any dead time between sweep segments is preferably zero, but never more than the listen time used in conventional HFVS.

Figure 4:
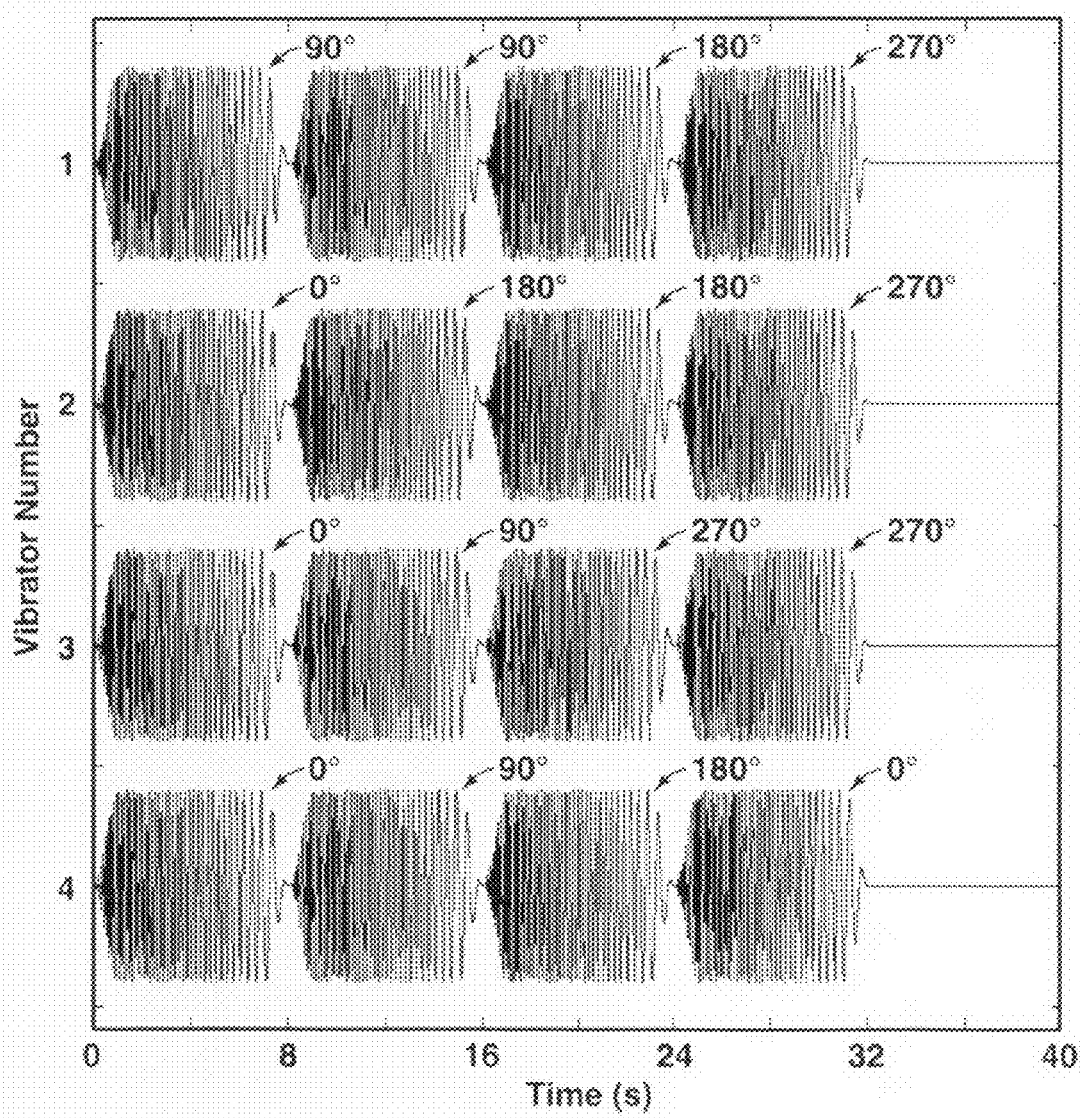
FIG. 4 shows sweeps for four vibrators in another embodiment of the present invention.

The sweep for each vibrator must be unique, i.e., no two vibrators can have exactly the same sweep. This is necessary in order that the data for each vibrator can be separated from the other vibrators. One way of accomplishing this is by applying a phase rotation to one or more of the segments of the sweep. For example, the first vibrator can have the first segment of the sweep at 90 degrees from all the other segments. The second vibrator can have the second segment at 90° from the other segments. The third vibrator has the third segment at 90° from the other segments. This pattern can continue for N vibrators and N segments as shown in FIG. 3. Alternatively the phase angles discussed in the HFVS patents can be used for the different segments. Using the cascaded sequence described by Anderson in which subsequent segments are phase rotated by 0, 90, 180 and 270 degrees combined with the 90° phase rotation above, as shown in FIG. 4, has particular advantages in reducing harmonics. Other ways of generating a unique sweep by using different frequency ranges, sweep rates, or by using different random sweeps can also be used in the present invention.

Figure 2:
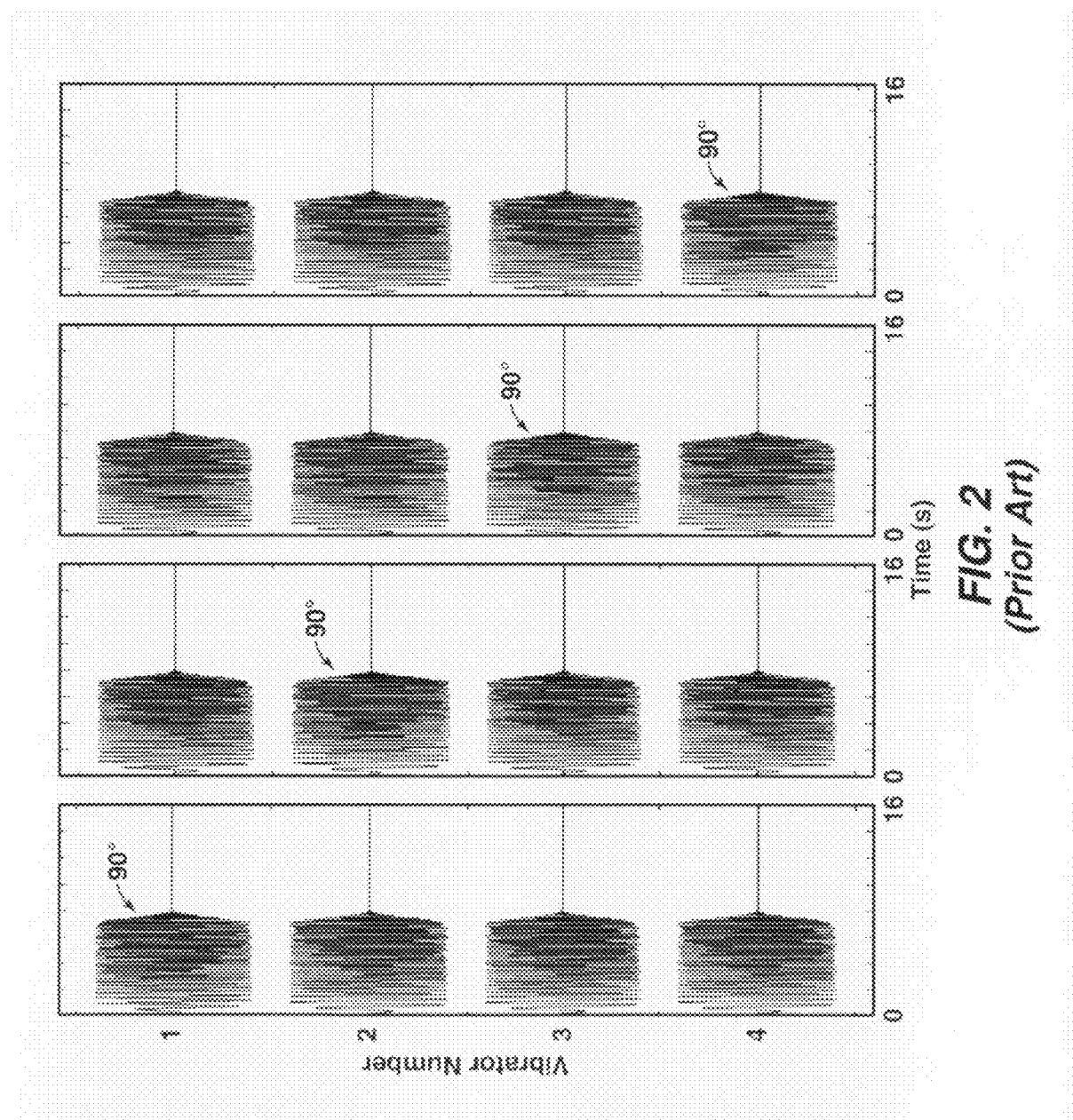
FIG. 2 shows typical sweeps and listening time used to acquire HFVS data with four vibrators.
Figure 5:
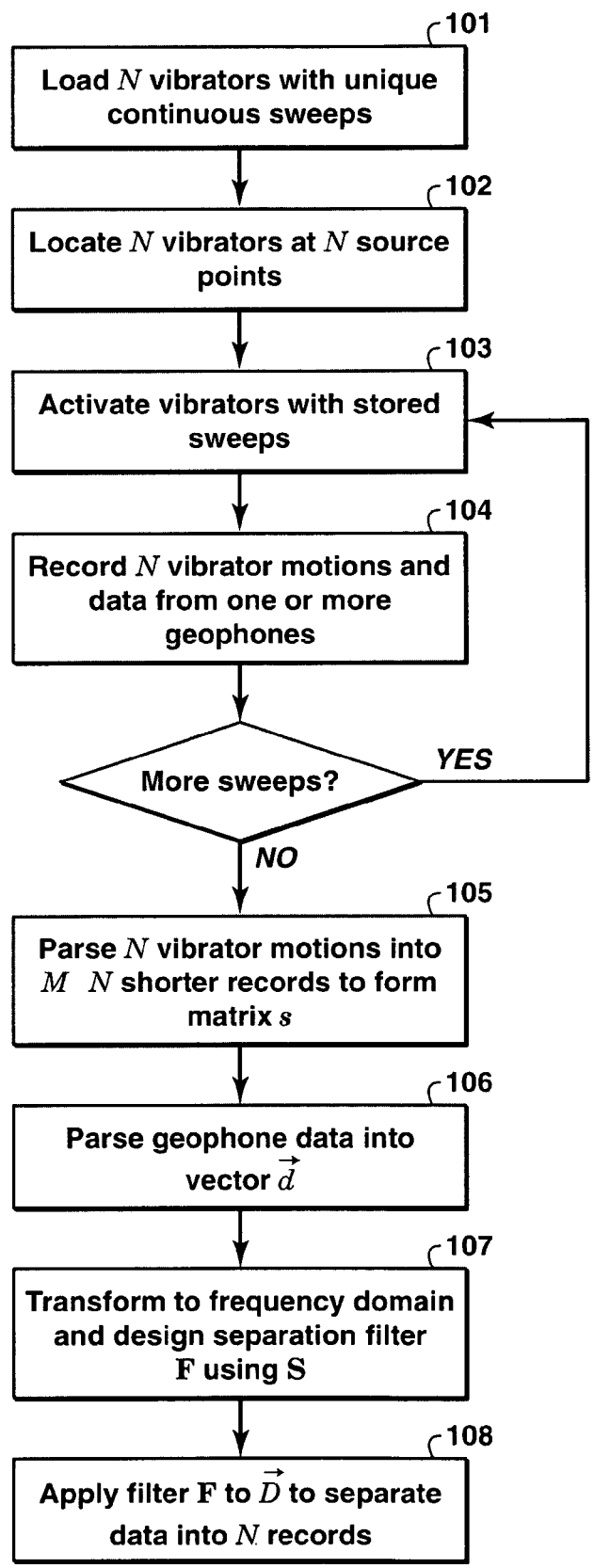
FIG. 5 is a flow chart showing the main steps of one embodiment of the present invention.

FIG. 5 is a flow chart showing the main steps of one embodiment of the present invention. In step 101, the sweeps, as shown for example in FIG. 3 or 4, are loaded into the vibrator controllers for the corresponding vibrators. Each vibrator receives a unique sweep, conveniently (but not necessarily) accomplished by the phase rotation technique discussed previously. Unlike the HFVS method, the sweep is a single, long, continuous sweep, exemplified by the sweeps shown in FIG. 3 and FIG. 4 which are composed of four segments of 8 s each, followed by an 8 s listen time. This is to be contrasted with the typical HFVS sweep of FIG. 2 in which there are four 8 s sweeps, but each is followed by an 8 s listen time. Thus, in this example, to get the same amount of source energy into the ground takes 64 s with HFVS as compared to 40 s with the present inventive method. Each of the N single continuous sweeps used in step 101 for the N vibrators must be divided into at least N segments, each segment in the sweep of any one vibrator being of the same length (time duration) as the corresponding segments in the sweeps of all the other vibrators. For example, the second segment should be the same length for all vibrators, as should the fourth (or any other) segment, but the length of the second segments can be different than the length of the fourth.

In step 102 (could be performed before step 101), the vibrators are located at preselected locations. All the vibrators are then simultaneously excited by their corresponding pilot sweep (step 103), and a single long record is recorded from one or more detectors in step 104. The length of the data record will be the length of the pilot sweep plus one listening time. In addition, the measured motions of each vibrator, typically signals from accelerometers mounted on the baseplate and on the reaction mass of each vibrator are recorded. Besides its use in the s and S matrices in Equations (1)-(5), this ground force signal, which may be computed as the mass-weighted sum of the baseplate and reaction mass accelerometer signals, is typically used in a feedback loop to control the excitation of the vibrator. Any other signal such as the pilot signal itself that could be considered representative of the source signature may be used for the purposes of the present invention.

In step 105, the measured motion records for each vibrator are parsed into M traces (shorter records) composed of the M≧N individual time segments into which the pilot sweeps were divided in step 101. The shorter records are then lengthened by adding zeros to the end, called padding the traces. The end padding should extend the duration sufficiently to, in effect (not in reality), provide a listening time (two-way seismic wave travel time to the deepest reflector of interest) for the segment. More padding beyond that desired amount will increase computation time without added benefit. Zeros or padding can also be applied to the beginning of each trace if desired. Because the segment length is preferably chosen to be longer than the desired listening time, it may be convenient to standardize the total padding duration to be the same as the original segment duration so that the total trace length is twice the segment length. The M traces become part of the sweep matrix s from Equation (1). For example, $s_{11}$ is equal to the measured motion for the first vibrator for the duration of the first segment plus the zero padding at the end of the segment. The element $s_{12}$ is equal to the measured motion for the first vibrator for the duration of the second segment plus the zero padding at the end of the segment, etc.

In step 106, a copy of the geophone data record is parsed to make N shorter records, each of duration equal to a segment duration plus the duration of the padded length used for the measured motions. In one embodiment of the present invention, the first record would correspond to the first segment plus the data before and after the segment corresponding to the padded time. The second record would consist of the second segment plus the padded time, etc. The N records make up the vector $\vec{d}$ that appears in Equation (1) above. The end padding in step 105 should be of sufficient duration to capture the seismic response due to the end of that source motion segment.

If desired, more sweeps can be performed to build up energy, adding more rows to the sweep matrix s and the data vector $\vec{d}$. Because the system of simultaneous equations will not be linear in the time domain, the Fourier transform is computed yielding the matrix S and vector $\vec{D}$, and a separation and inversion filter F is derived in step 107 by inverting the matrix S using Equation (9). Equation (6) may be used if M is chosen to be equal to N. For M>N, the system of equations is over-determined, and a best-fit solution is obtained using a criterion such as least squares. This approach may be useful even where M is chosen to be equal to N because one of the vibrators may be temporarily unavailable and recording could proceed with fewer vibrators. The method can proceed even if the number of vibrators drops temporarily to one during acquisition. A person skilled in the art will understand that although matrix formalism is used in the preceding description, any method, numerical or analytical, of solving M simultaneous linear equations in N unknowns may be used in the present invention. Next, in step 108, the filter is applied to the data vector $\vec{D}$, and the inverse Fourier transform is computed resulting in N separated records $E_j(f)$ where f is frequency. With the above procedure, harmonics and data from subsequent and previous segments will appear at times greater than the segment length, and they will not interfere with the target reflections. Persons skilled in the art will understand that the filter F could be inverse-transformed to the time domain and then applied to the time domain data. Similarly, the order of steps 106 and 107 may be interchanged. Such alternative procedures are insubstantial changes and hence equivalents to the procedure described above, and therefore are part of the present invention.

EXAMPLES

Figure 6:
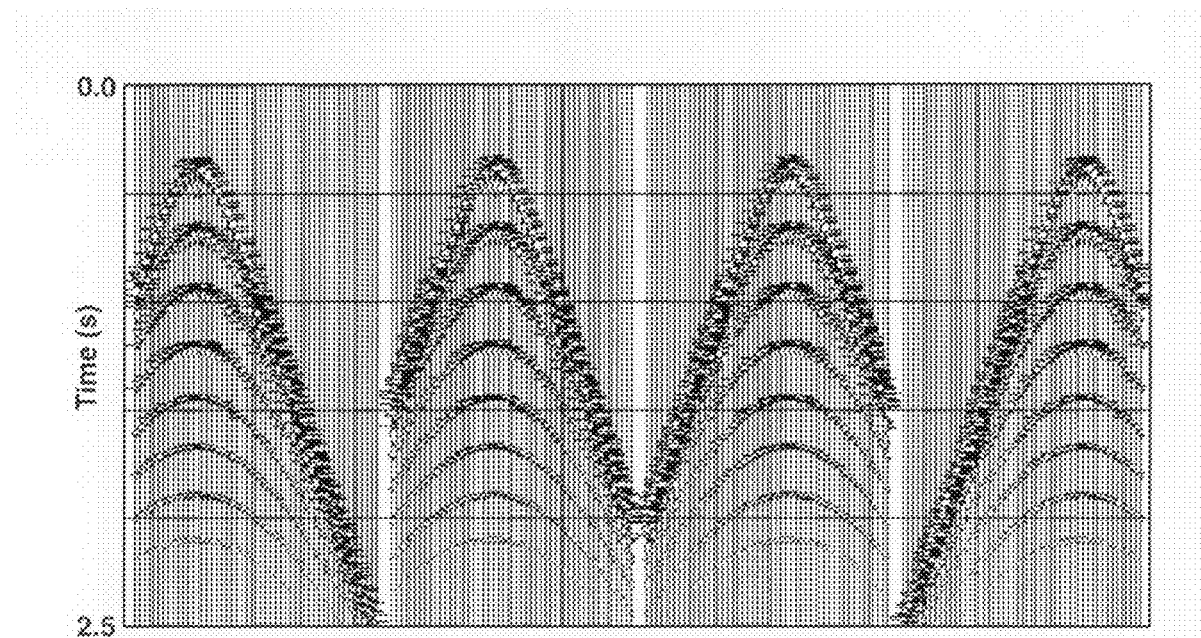
FIG. 6 shows the results of a model simulation of HFVS recording.
Figure 7:
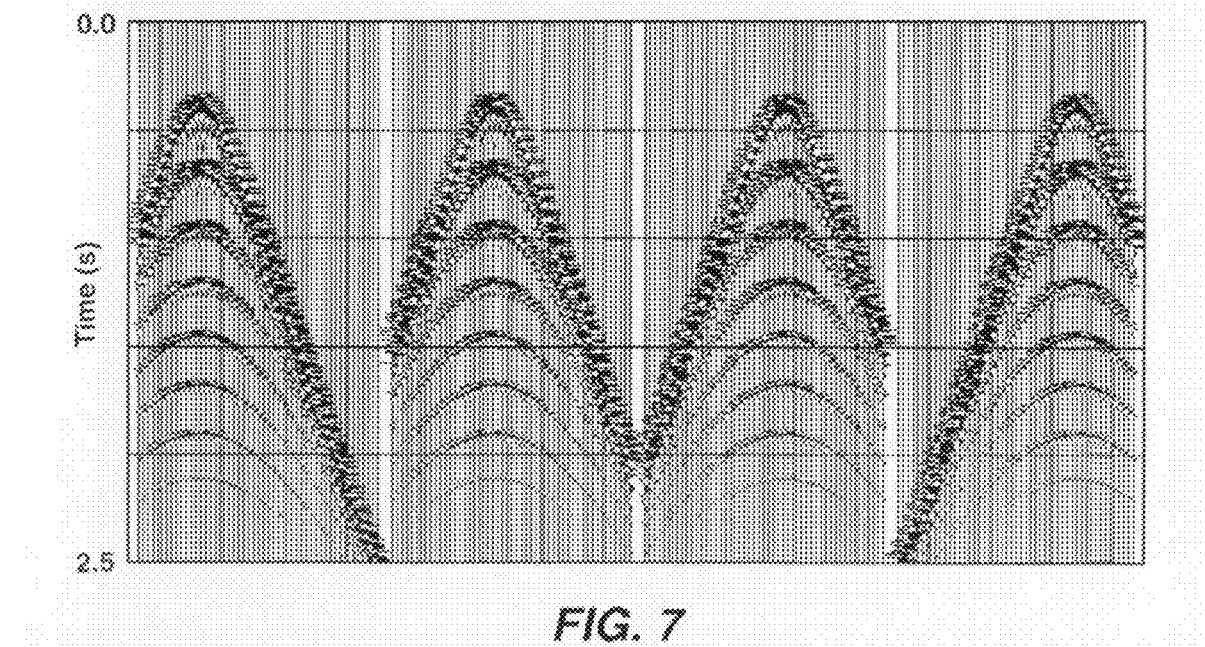
FIG. 7 shows the results of a model simulation of the present invention.

FIG. 6 and FIG. 7 compare the first 2.5 seconds of model data after the process of separation and inversion using the conventional HFVS method (FIG. 6) and the method of the present invention (FIG. 7). The model data are generated using 51 receivers, 400 feet apart. Four sources are located at distances of 5000, 8333, 11666, and 15000 feet from the first receiver. The data for each source location were convolved with actual vibrator signatures from field measurements and combined to simulate simultaneous acquisition of the four sources. The vibrator sweep for HFVS was an 8-s linear sweep from 8 to 128 Hz. The vibrator sweep for the present invention is a 32-s sweep composed of four 8-s segments. The horizontal axis in each figure displays receiver location, by source. The results after separation and inversion of the model data show little difference between the two methods, and both perfectly separate the reflection data for the 4 sources.

Figure 8:
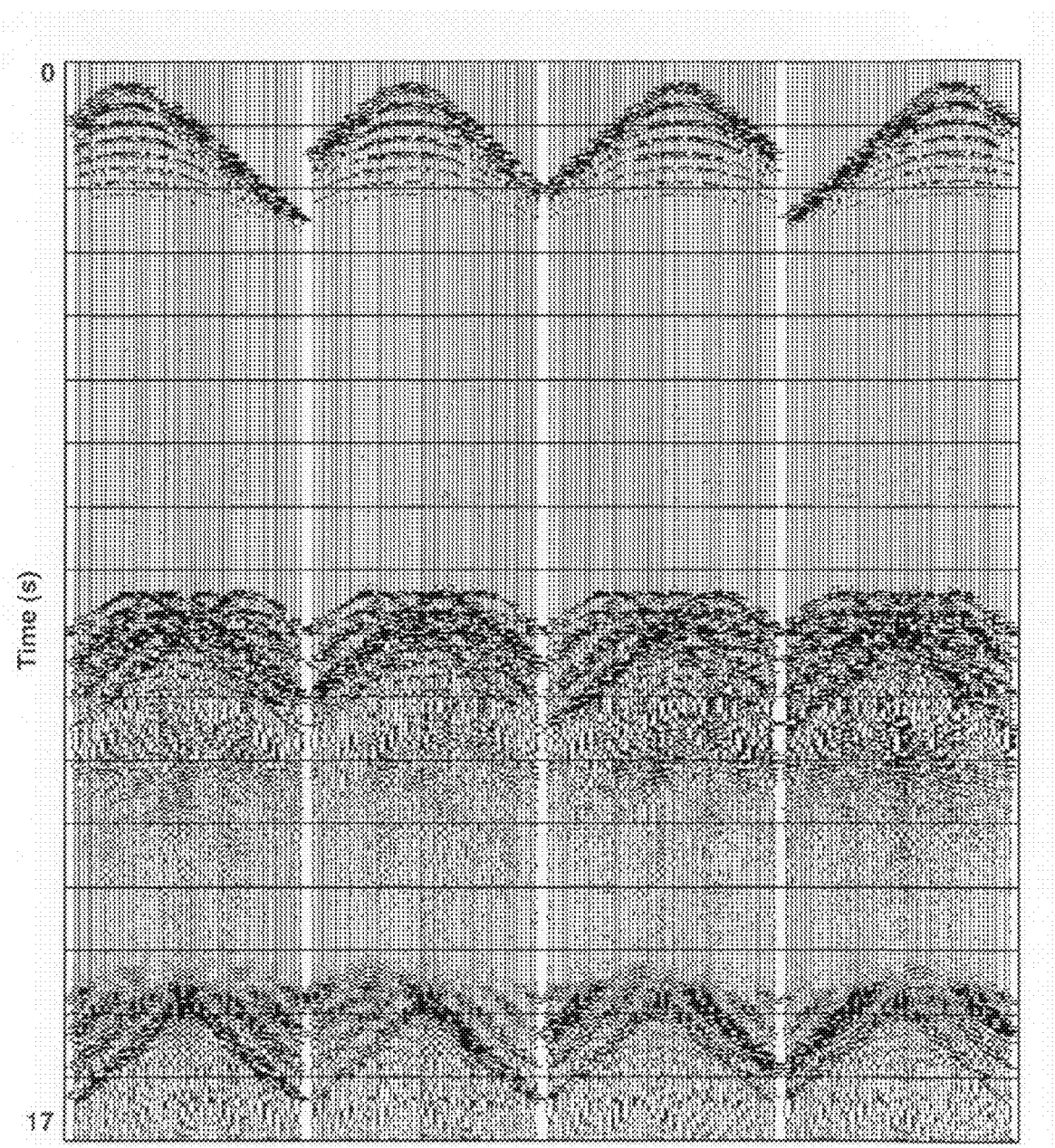
FIG. 8 shows the results of FIG. 7 for times longer than the 8-s sweep segment length.

FIG. 8 shows the separated and inverted results generated by the present invention for a longer time period of the continuous sweep than is shown in FIG. 7. The sweep segment is a down-sweep. As can be seen, the separated records are clean for the top 8 seconds, which corresponds to the segment length as illustrated in FIG. 3. (This illustrates the reason why segment length in the present invention is preferably chosen to be at least as long as the seismic wave travel time down to and back up from the deepest reflector of interest.) Interference from the subsequent sweep occurs after 8 s and interference from the previous sweep occurs after 15 s. These are separated into the individual source locations. Noise from harmonics, which are not perfectly matched with the proper vibrator signatures, appears after the primary interference from the subsequent sweep at around 10-14 seconds.

The foregoing description is directed to particular embodiments of the present invention for the purpose of illustrating it. It will be apparent, however, to one skilled in the art that many modifications and variations to the embodiments described herein are possible. For example, in step 107 of FIG. 5, the system of equations is Fourier transformed to the frequency domain. Any other transform that produces a system of linear equations in the transform domain will work in the present inventive method, and the appended claims are to be understood to include any such transforms. All such modifications and variations are intended to be within the scope of the present invention, as defined in the appended claims.

The invention claimed is:

1. A method of separating the seismic response for each of a plurality N of seismic vibrators operated simultaneously with continuous sweeps, said method comprising the steps of:
    (a) obtaining a seismic data record of the combined response signals from all vibrators as detected and recorded by at least one detector, each vibrator having been loaded with a unique continuous sweep signal consisting of $M \geq N$ segments, the $i^{th}$ segment being of the same duration for each vibrator, i=1, 2, ..., M;
    (b) obtaining a vibrator motion record for each vibrator containing a signature for each vibrator indicative of the motion of that vibrator;
    (c) parsing the vibrator motion record for each vibrator into M shorter records, each shorter record coinciding in time with a sweep segment, and then padding the end of each shorter record sufficiently to extend its duration by substantially one listening time;
    (d) forming an M×N matrix s whose element $s_{ij}(t)$ is the padded shorter vibrator motion record as a function of time t for the $i^{th}$ vibrator and $j^{th}$ sweep segment;
    (e) parsing the seismic data record from step (a) into M shorter records, each shorter record coinciding in time with a padded shorter record of vibrator motion from step (c);
    (f) forming a vector $\vec{d}$ of length M whose element $d_i$ is the $i^{th}$ shorter data record from the preceding step;
    (g) solving for $E_j(f)$ the following system of M linear equations in N unknowns
    $$S\vec{E} = \vec{D}$$
    where $S_{ij}(f)$ is the Fourier transform to the frequency (f) domain of $s_{ij}(t)$ and $D_i(f)$ is the Fourier transform of $d_i(t)$, where i=1, 2, ... M and j=1, 2, ... N; and
    (h) inverse Fourier transforming the $E_j(f)$ to yield $e_j(t)$.

2. The method of claim 1, wherein each sweep segment is selected from one of the following sweep-design categories: (a) linear, (b) nonlinear, and (c) pseudo-random.

3. The method of claim 1, wherein all of the N unique continuous sweeps are identical except for the phase of their segments.

4. The method of claim 3, wherein all M segments are identical except for phase, and the phase differences for the N sweeps are determined by the following steps: (a) constructing a reference sweep by starting with a preselected reference segment, then advancing the segment 360/M degrees in phase to make the second segment, then advancing the phase 360/M more degrees to make the third segment, and so on to generate a sweep of M segments; (b) constructing a first sweep by advancing the phase of the first segment of the reference sweep by 90 degrees; (c) constructing a second sweep by advancing the phase of the second segment of the reference sweep by 90 degrees; (d) and so on until N sweeps are constructed.

5. The method of claim 1, wherein each unique continuous sweep has a duration in time sufficiently long to collect all seismic data desired before relocating the vibrators.

6. The method of claim 1, wherein the vibrator motion record for each vibrator is a weighted sum or ground force record of the motion of that vibrator.

7. The method of claim 1, wherein M=N and the system of linear equations $S\vec{E} = \vec{D}$ is solved by matrix methods comprising the steps of deriving a separation and inversion filter $(S)^{-1}$ by inverting the matrix S, then performing the matrix multiplication $(S)^{-1}\vec{D}$.

8. The method of claim 1, wherein the system of linear equations $S\vec{E} = \vec{D}$ is solved by matrix methods and the method of least squares comprising the steps of deriving a separation and inversion filter of the form $F=(S^*S)^{-1}S^*$, then performing the matrix multiplication $F\vec{D}$.

9. The method of claim 1, wherein each segment has a duration that is at least as long as the seismic wave travel time down to and back up from the deepest reflector of interest.

10. A method of separating the seismic response for each of a plurality N of seismic vibrators operated simultaneously with continuous sweeps, said method comprising the steps of:
    (a) loading each vibrator with a unique continuous sweep signal consisting of $M \geq N$ segments, the $i^{th}$ segment being of the same duration for each vibrator, i=1, 2, ..., M;

(b) activating all vibrators and using at least one detector to detect and record the combined seismic response signals from all vibrators;

(c) recording a vibrator motion record for each vibrator indicative of the signature of that vibrator; and (d) obtaining a processed seismic data record wherein the record of the combined seismic response signals from all vibrators has been processed by parsing the vibrator motion record for each vibrator into M shorter records, each shorter record coinciding in time with a sweep segment, and then padding the end of each shorter record sufficiently to extend its duration by substantially one listening time;

forming an M×N matrix s whose element $s_{ij}(t)$ is the padded shorter vibrator motion record as a function of time t for the $i^{th}$ vibrator and $j^{th}$ sweep segment;

parsing the seismic data record from step (b) into M shorter records, each shorter record coinciding in time with a padded shorter record of vibrator motion;

forming a vector $\vec{d}$ of length M whose element $d_i$ is the $i^{th}$ shorter data record;

solving for $E_j(f)$ the following system of M linear equations in N unknowns $$s\vec{E} = \vec{D}$$

where $S_{ij}(f)$ is the Fourier transform to the frequency (f) domain of $s_{ij}(t)$ and $D_i(f)$ is the Fourier transform of $d_i(t)$, where i=1, 2, ... M and j=1, 2, ... N; and inverse Fourier transforming the $E_j(f)$ to yield $e_j(t)$.

11. The method of claim 10, wherein each sweep segment is selected from one of the following sweep-design categories: (a) linear, (b) nonlinear, and (c) pseudo-random.

12. The method of claim 10, wherein all of the N unique continuous sweeps are identical except for the phase of their segments.

13. The method of claim 12, wherein all M segments are identical except for phase, and the phase differences for the N sweeps are determined by the following steps: (a) constructing a reference sweep by starting with a preselected reference segment, then advancing the segment 360/M degrees in phase to make the second segment, then advancing the phase 360/M more degrees to make the third segment, and so on to generate a sweep of M segments; (b) constructing a first sweep by advancing the phase of the first segment of the reference sweep by 90 degrees; (c) constructing a second sweep by advancing the phase of the second segment of the reference sweep by 90 degrees; (d) and so on until N sweeps are constructed.

14. The method of claim 10, wherein each unique continuous sweep has a duration in time sufficiently long to collect all seismic data desired before relocating the vibrators.

15. The method of claim 10, wherein the vibrator motion record for each vibrator is a weighted sum or ground force record of the motion of that vibrator.

16. The method of claim 10, wherein M=N and the system of linear equations $S\vec{E} = \vec{D}$ is solved by matrix methods comprising the steps of deriving a separation and inversion filter $(S)^{-1}$ by inverting the matrix S, then performing the matrix multiplication $(S)^{-1}\vec{D}$.

17. The method of claim 10, wherein the system of linear equations $S\vec{E} = \vec{D}$ is solved by matrix methods and the method of least squares comprising the steps of deriving a separation and inversion filter of the form $F = (S^*S)^{-1}S^*$, then performing the matrix multiplication $F\vec{D}$.

18. The method of claim 10, wherein each segment has a duration that is at least as long as the seismic wave travel time down to and back up from the deepest reflector of interest.

* * * * *